United States Patent [19]

Matsuda

[11] Patent Number: 4,728,995
[45] Date of Patent: Mar. 1, 1988

[54] DEVICE FOR ADJUSTING EXPOSURE AMOUNT

[75] Inventor: Shinya Matsuda, Toyokawa, Japan

[73] Assignee: Minolta Camera Kabushiki Kaisha, Osaka, Japan

[21] Appl. No.: 22,821

[22] Filed: Mar. 6, 1987

[30] Foreign Application Priority Data

Mar. 11, 1986 [JP] Japan ............... 61-34857[U]

[51] Int. Cl.$^4$ ............................................. G03B 27/72
[52] U.S. Cl. ................................................... 355/71
[58] Field of Search ................... 355/3 R, 71, 14 E; 362/256, 279, 300, 307, 293, 31, 32, 294, 297, 298, 302, 304, 346

[56] References Cited

U.S. PATENT DOCUMENTS 4,257,086  3/1981  Gulliksen ..................... 355/71 X
4,333,130  6/1982  Mochizuki et al. ............ 355/71 X
4,627,704 12/1986  Hamasaki et al. ............. 355/71 X

FOREIGN PATENT DOCUMENTS 5455821  9/1952  Japan .
56172854  5/1955  Japan .

Primary Examiner—Richard A. Wintercorn
Attorney, Agent, or Firm—Burns, Doane, Swecker & Mathis

[57] ABSTRACT

A device for adjusting the amount of exposure for use in copying machines or in the original reading device of facsimile systems comprises an illumination system having a first illumination optical path and a second illumination optical path through which the light from a light source is concentrated on the surface of an original for illumination. The amounts of light through both the first and second optical paths are controllable to provide an adjusted uniform amount of exposure without impairing the balance between the two paths in the amount of light. A single light blocking member disposed at the intersection of the first and second optical paths and movable into the paths regulates the amounts of light through the two paths. The device is therefore simple in construction and inexpensive.

9 Claims, 6 Drawing Figures

DEVICE FOR ADJUSTING EXPOSURE AMOUNT

BACKGROUND OF THE INVENTION

1. Field of the Invention

The present invention relates to a device for adjusting the amount of exposure for use in copying machines, the original reading device of facsimile systems, etc.

2. Description of the Prior Art

In copying machines and the like, an illumination system as shown in FIGS. 1 or 2 is used for illuminating the surface of an original in the form of a slit so as not to produce a shadow on the object (original) when the object is a book or the like having an indentation.

The illumination system comprises a tubular light source lamp a, a main reflecting mirror b and a subreflecting mirror c. The system has a first illumination nation optical path p for reflecting the light from the light source lamp a at the main reflecting mirror b and concentrating the light on the surface of the original d, and a second illumination optical path q for concentrating the light from the lamp a on the original surface d upon reflection at the mirror b and the subreflecting mirror c.

The machines of a particular type have a specified ratio between the amount of light projected upward obliquely rightward in the drawing onto the original through the first path p and the amount of light projected upward obliquely leftward on the original through the second path q.

On the other hand, the tubular light source lamp a used is a halogen lamp or the like which varies longitudinally thereof in the amount of light emitted, while the amount of light reflected at the main reflecting mirror b or the subreflecting mirror c also varies longitudinally thereof. It is therefore difficult to give the slit-like illumination area on the original surface d a uniform illuminance distribution longitudinally of the area.

It is further known to provide a movable light blocking member A in the first optical path between the reflecting mirror b and the original surface d for adjusting the amount of light through the path P longitudinally of the slit-like illumination area as seen in FIG. 1. Similarly, a known movable light blocking member B is disposed in the second optical path q between the main reflecting mirror b and the subreflecting mirror c for adjusting the amount of light through the path q longitudinally of the slit-like illumination area as shown in FIG. 2.

However, either of these conventional arrangements is adapted to adjust the amount of light through only one of the first optical path p and the second optical path q, resulting in a variation in the light amount ratio. Thus, even if the overall amount of exposure is controllable to a predetermined value, the arrangement locally upsets the balance between the amounts of right and left portions of the light reaching the original surface d. In the case of copying machines, for example, this gives rise to the problem of producing a shadow on the copy locally.

SUMMARY OF THE INVENTION

An object of the present invention is to overcome the foregoing drawback and to provide a device for adjusting the amount of exposure properly.

Another object of the present invention is to provide a device for adjusting the amount of exposure which comprises a regulating member for regulating the amount of light emitted by a light source so as to properly illuminate the surface of an original.

Another object of the present invention is to provide a device for adjusting the amount of exposure which comprises a first reflecting member and a second reflecting member and in which the amount of light through an optical path from the first reflecting member toward the surface of an original and the amount of light through an optical path from the first reflecting member toward the second reflecting member are both regulated at the same time.

Another object of the present invention is to provide a device of the type mentioned for adjusting the amount of exposure to illuminate the original with a proper amount of light while maintaining a specified ratio between the amounts of light through the two optical paths.

Another object of the present invention is to provide a device of the type mentioned for adjusting the amount of exposure which comprises a light blocking member disposed at the intersection of the two optical paths and movable into both the optical paths so as to properly adjust the amount of light by a simple structure.

Still another object of the present invention is to provide a device of the type mentioned for adjusting the amount of exposure which includes an elongated tubular light source for illuminating the original in the form of a slit and in which the amounts of light reaching the original through the two optical paths can be regulated at the same time longitudinally of the slit-like illumination area.

Other objects and features of the present invention will become apparent from the following description with reference to the accompanying drawings.

DETAILED DESCRIPTION OF THE INVENTION

Figure 3:
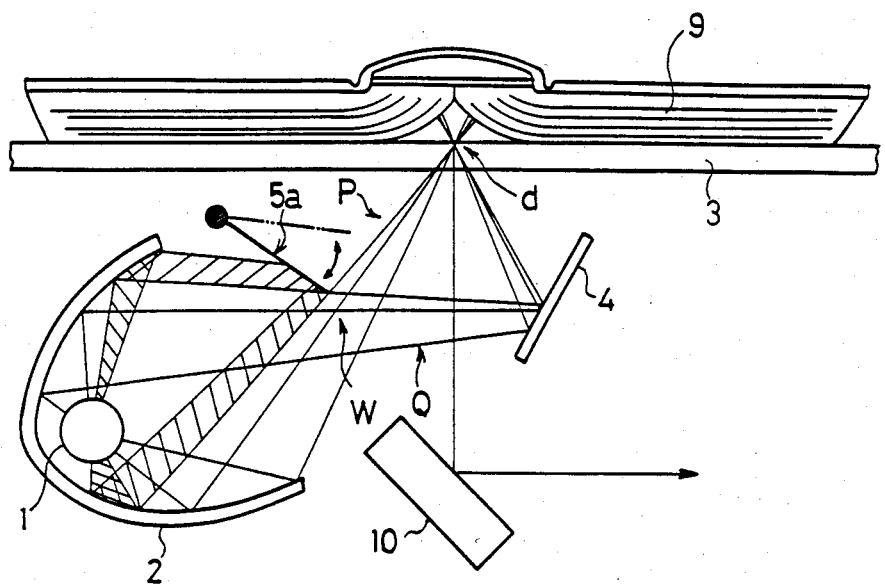
FIG. 3 is a side elevation of an original illuminating device having exposure amount adjusting means according to a first embodiment of the invention.
Figure 4:
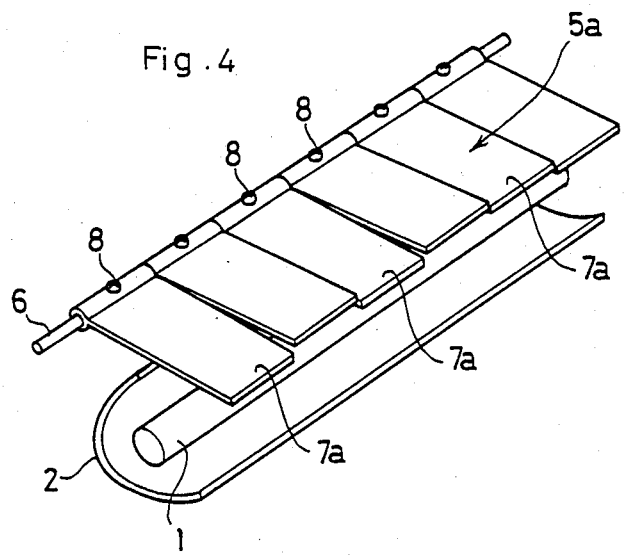
FIG. 4 is a perspective view specifically showing the exposure amount adjusting means of FIG. 3.

FIGS. 3 and 4 show a first embodiment of the present invention. The illumination system of the invention comprises a tubular light source lamp 1, a main reflecting mirror 2 and a subreflecting mirror 4. An original table 3 may be of the movable type or of the fixed type. The light source lamp 1 used is a halogen lamp but may be a fluorescent lamp or some other light source. The light from the light source lamp 1 is reflected at the main reflecting mirror 2, whereupon a portion of the reflected light is concentrated directly on the surface d of an original 9 in the form of a slit. The remaining portion of the light is reflected at the subreflecting mirror 4 again and then concentrated on original surface d in the form of a slit. For concentrating or converging the light, the main reflecting mirror 2 has a quadratic surface and is disposed in parallel to the lamp 1. The subreflecting mirror 4 comprises a plane mirror and is inclined at a specified angle for reflecting the light from the mirror 2 toward the original surface d.

Thus, the above illumination system has a first illumination optical path P through which the light from the light source lamp 1 is concentrated on the original surface d in the form of a slit upon reflection from the main reflecting mirror 2, and a second illumination optical path Q through which the light from the lamp 1 is concentrated on the surface d in the form of a slit upon reflection at the mirror 2 and the subreflecting mirror 4. The light proceeding from the main reflecting mirror 2 toward the original surface d through the first optical path P and the light traveling from the mirror 2 toward the subreflecting mirror 4 through the second optical path Q intersect each other at a position W, where a movable light blocking member 5a is disposed for adjusting the amounts of light through the paths P and Q longitudinally of the slit-like illumination area. With the present embodiment, the blocking member 5a is located at the upper side of the position W.

With reference to FIG. 4, the movable light blocking member 5a comprises a plurality of light blocking plates 7a mounted on a support rod 6, adjustable in angular position and arranged longitudinally of the slit-like illumination area. Each of the blocking plates 7a is fixed in the desired angular position about the rod 6 with a fastening screw 8. The angle of the blocking plate 7a is adjustable by hand or with a jig. It is also possible to adjust the angle of the blocking plate 7a using an adjusting screw.

In adjusting the amount of light longitudinally of the slit-like illumination area, the light through the first optical path P and the light through the second optical path Q can be adjustingly blocked by the same ratio at the same time by adjusting the angle of each light blocking plate 7a. Consequently, the upward light incident on the original 9 obliquely leftward can be maintained in proper balance with the upward light incident on the original obliquely rightward with respect to the amount of light. The light reflected from the original surface d is guided by a mirror 10, lens, etc. and impinges on a photoconductive drum or the like (not shown).

Figure 5:
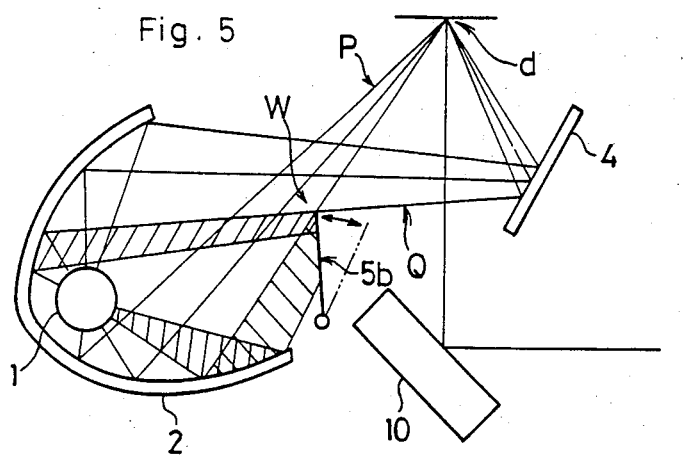
FIG. 5 is a side elevation of an original illuminating device having exposure amount adjusting means according to a second embodiment of the invention.

FIG. 5 shows a second embodiment of the present invention, which includes a movable light blocking member 5b like the first embodiment. The blocking member 6b is disposed at the lower side of the position W.

Figure 6:
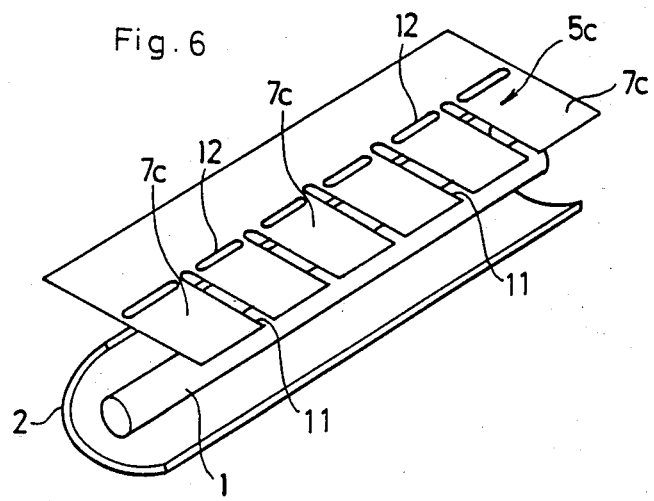
FIG. 6 is a perspective view showing exposure amount adjusting means according to a third embodiment of the invention.

FIG. 6 shows a third embodiment of the invention, in which a movable light blocking member 5c is made of a planar plate. The plate is partly divided by a plurality of incisions 11 into segments 7c arranged longitudinally of the plate. The divided segments 7c are bent to a suitable angular position with an external force as by a jig or hand to control the amount of light to be blocked by each segment 7c. To render the segments 7c readily bendable, punch holes 12 are formed in the plate.

The movable light blocking member 5c of the present embodiment is disposed also in the position shown in FIGS. 3 or 5.

Figure 1:
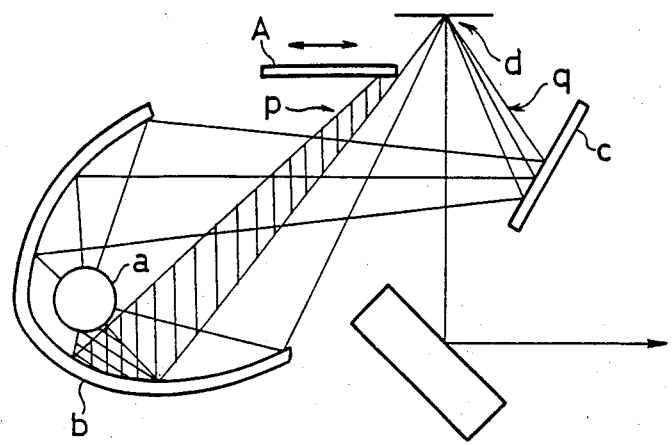
FIGS. 1 and 2 are side elevations each showing an original illuminating device having conventional exposure amount adjusting means.
Figure 2:
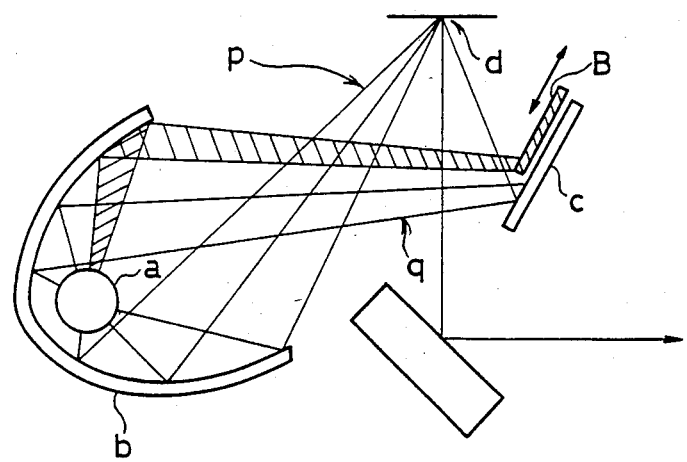

Besides the above embodiments, the present invention can be embodied variously. For example, the movable light blocking members described above can be made slidable like those of the prior art shown in FIGS. 1 and 2. Further as disclosed in U.S. Pat. No. 4,080,057, the light blocking member can be in the form of a flexible plate spring member which is supported by a screw, such that the flexible member is partially movable into or out of the optical paths by vertically moving the screw to adjust the amount of light on the surface of the original.

What is claimed is:

1. A device for adjusting the amount of exposure comprising:
    a light source,
    means for causing a relative movement between the light source and a zone of illumination by the light source,
    a first reflecting member having a first portion and a second portion for reflecting the light from the light source in two different directions, the first portion providing a first optical path for directing the light from the light source directly toward the illumination zone, the second portion providing a second optical path for directing the light from the light source toward a direction intersecting the first optical path.
    a second reflecting member for reflecting the light through the second optical path toward the illumination zone, and
    a light blocking member for regulating the amount of light through the first optical path and the amount of light through the second optical path by blocking the light.

2. A device as defined in claim 1 wherein the light blocking member is disposed at the intersection of the first and second optical paths and movable into both the optical paths.

3. A device as defined in claim 1 wherein the first reflecting member is provided with a quadratic surface having the first portion and the second portion for providing the first and second optical paths.

4. A device for adjusting the amount of exposure comprising:
    a light source,
    means for causing a relative movement between the light source and a slit-like zone of illumination by the light source,
    a first reflecting member having a first portion and a second portion for reflecting the light from the light source in two different directions, the first portion providing a first optical path for directing the light from the light source directly toward the illumination zone, the second portion providing a second optical path for directing the light from the light source toward a direction intersecting the first optical path,
    a second reflecting member for reflecting the light through the second optical path toward the illumination zone, and
    a light blocking member for regulating longitudinally of the slit-like illumination zone the amount of light through the first optical path and the amount of light through the second optical path by blocking the light.

5. A device as defined in claim 4 wherein the light blocking member is disposed at the intersection of the first and second optical paths and movable into both the optical paths.

6. A device as defined in claim 4 wherein the light blocking member has a plurality of light blocking pieces arranged longitudinally of the slit-like illumination zone, and the light blocking pieces are individually adjustable in angle.

7. A device as defined in claim 6 wherein the light blocking pieces are rotatably mounted on a rod extending in parallel with the light source and angularly adjustable by rotation.

8. A device as defined in claim 6 wherein each of the light blocking pieces are angularly adjustable by being bent at its base portion.

9. A device as defined in claim 4 wherein the light blocking member has a plurality of light blocking pieces arranged longitudinally of the slit-like illumination zone, and the light blocking pieces are movable individually and slidably into the optical paths.

* * * * *